(12) United States Patent
Pai

(10) Patent No.: US 7,604,190 B2
(45) Date of Patent: Oct. 20, 2009

(54) DISCHARGE OPENING AND POWER CONTROL STRUCTURE OF A GRINDER

(76) Inventor: Chung-Jen Pai, 1F, No. 83, Lane 26, Chung Hsiao St., Chung Ho, Taipei Hsien (TW)

( * ) Notice: Subject to any disclaimer, the term of this patent is extended or adjusted under 35 U.S.C. 154(b) by 221 days.

(21) Appl. No.: 11/812,244

(22) Filed: Jun. 15, 2007

(65) Prior Publication Data

US 2009/0108111 A1    Apr. 30, 2009

(30) Foreign Application Priority Data

Feb. 5, 2007    (TW) ............................... 96104140 A

(51) Int. Cl.
*A47J 42/00* (2006.01)
(52) U.S. Cl. .................................................. 241/169.1
(58) Field of Classification Search ................. 241/168, 241/169.1
See application file for complete search history.

(56) References Cited

U.S. PATENT DOCUMENTS

| 4,960,246 A | * | 10/1990 | Fohrman | ................. | 241/169.1 |
| 5,865,384 A | * | 2/1999 | Pai | .............................. | 241/93 |
| 6,880,773 B2 | * | 4/2005 | Pai | .......................... | 241/169.1 |

* cited by examiner

*Primary Examiner*—Faye Francis
(74) *Attorney, Agent, or Firm*—Guice Patents PLLC

(57) ABSTRACT

A discharge opening and power control structure of a grinder is disclosed to include a grinder body, which has a discharge opening for discharge of the ground powder and a battery chamber with a positive and negative contacts extended out of the grinder body, and a shut device, which has a slot and a metal contact plate and is rotatable relative to the grinder body between the open position where the slot is in alignment with the discharge opening to open the discharge opening and the metal contact plate is in contact with the positive and negative contacts to turn on the power supply, and the close position where the discharge opening is closed and the power supply of the grinder is off.

11 Claims, 5 Drawing Sheets

US 7,604,190 B2

DISCHARGE OPENING AND POWER CONTROL STRUCTURE OF A GRINDER

BACKGROUND OF THE INVENTION

1. Field of the Invention

The present invention relates to grinders and more particularly, to a discharge opening and power control structure of a grinder.

2. Description of the Related Art

A conventional grinder can perform the basic functions of powder grinding job. However, the ground powder may stay at the clearance of the grinding device, support frame of the adjustment device or the discharge outlet. When put the grinder on a table or sink at this time, residual ground powder may fall from the grinder to contaminate the surface of the table or sink upon accidental vibration of the grinder, and a further cleaning will be necessary. In order to eliminate this problem, an axial connection cap may be coupled to the bottom side of the discharge outlet of the grinder, and operable to close or open the discharge outlet. However, during the operation of the grinder, the cap is extended outwards, obstructing the sense of beauty, and ground powder may fall to the cap, causing inconvenience.

The present inventor invented an improved design entitled "Shut device for a discharge outlet in a grinder" under Taiwan Patent No. 592113 (equivalent to U.S. Pat. No. 6,880,773). The shut device comprises a stationary part disposed at the bottom of the grinder, and a rotary part. Once the rotary part is turned, hollow openings of the rotary part can align with the discharge outlet for ground powder falling down or stop plates of the rotary part close the discharge outlet for preventing the powder from falling down. Further, the stationary part and the rotary part are conveniently detachable for cleaning, eliminating the non-detachable drawback of the axial connection cap of the prior art design.

The aforesaid shut device is functional in closing/opening the discharge outlet of the grinder. However, the user may forget to adjust the shut device to the open position before using the grinder. In this case, ground powder may be accumulated in the gap between the discharge outlet and the shut device. Therefore, an improvement is still necessary.

SUMMARY OF THE INVENTION

The present invention has been accomplished under the circumstances in view. It is therefore the main object of the present invention to provide a discharge opening and power control structure of a grinder, which automatically turns on power supply when opens the discharge opening of the grinder, and turns off power supply when closes the discharge opening of the grinder.

To achieve this and other objects of the present invention, the discharge opening and power control structure is used in a grinder, comprising a grinder body and a shut device. The grinder body comprises a discharge opening for discharge of the ground powder, and a battery chamber, which has a positive pole contact and a negative pole contact extended out of the grinder body. The shut device is coupled to the grinder body, and rotatable relative to the grinder body between a close position to close the discharge opening and to turn off power supply of the grinder body, and an open position to open the discharge opening and to turn on power supply of the grinder body. The shut device has a slot, which is in alignment with the discharge opening when the shut device is rotated relative to the grinder body to the open position, and a metal contact plate, which contacts the positive pole contact and the negative pole contact to turn on power supply of the battery chamber when the shut device is rotated relative to the grinder body to the open position.

DETAILED DESCRIPTION OF THE PREFERRED EMBODIMENT

Figure 1:
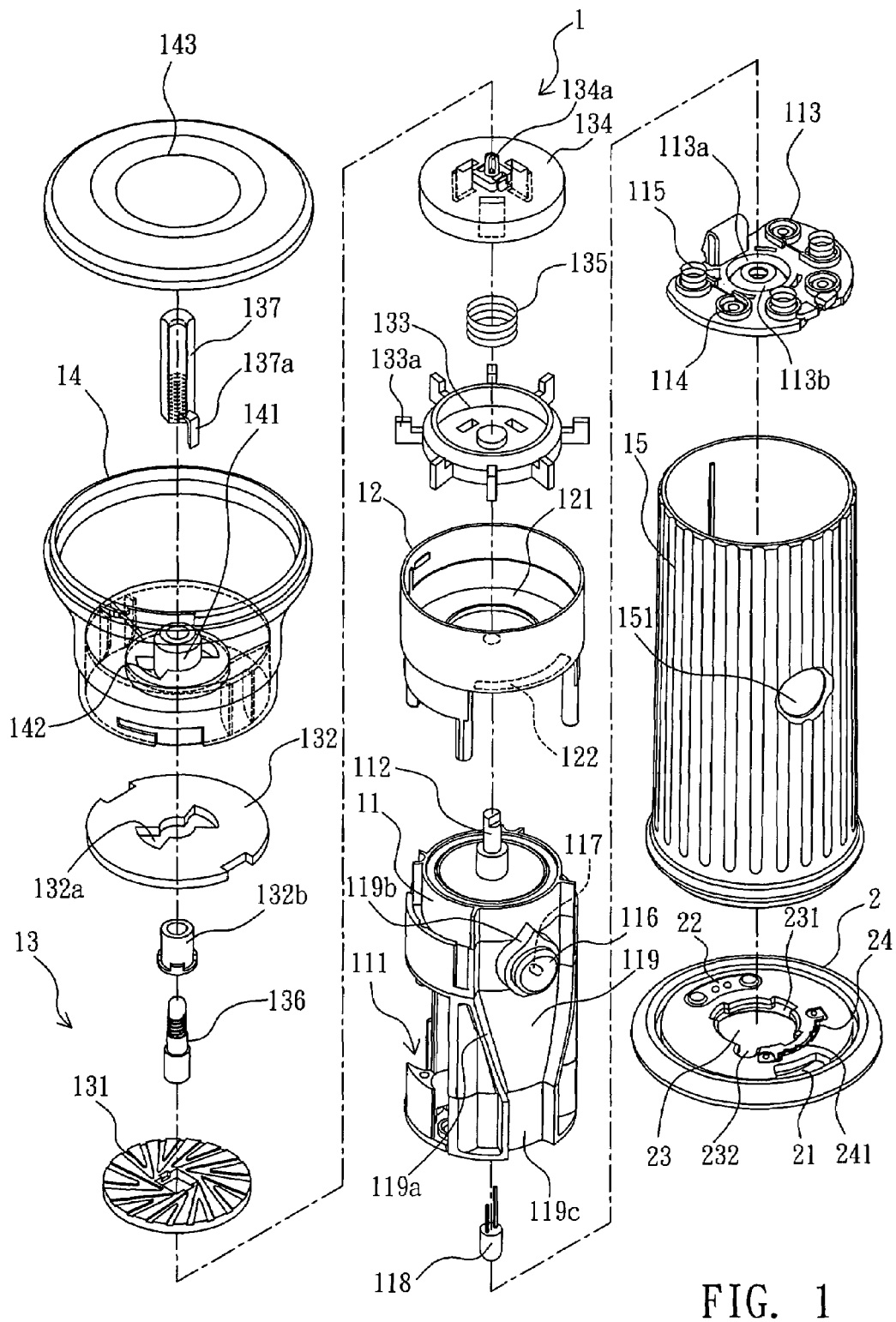
FIG. 1 is an exploded view of a grinder in accordance with the present invention.
Figure 2:
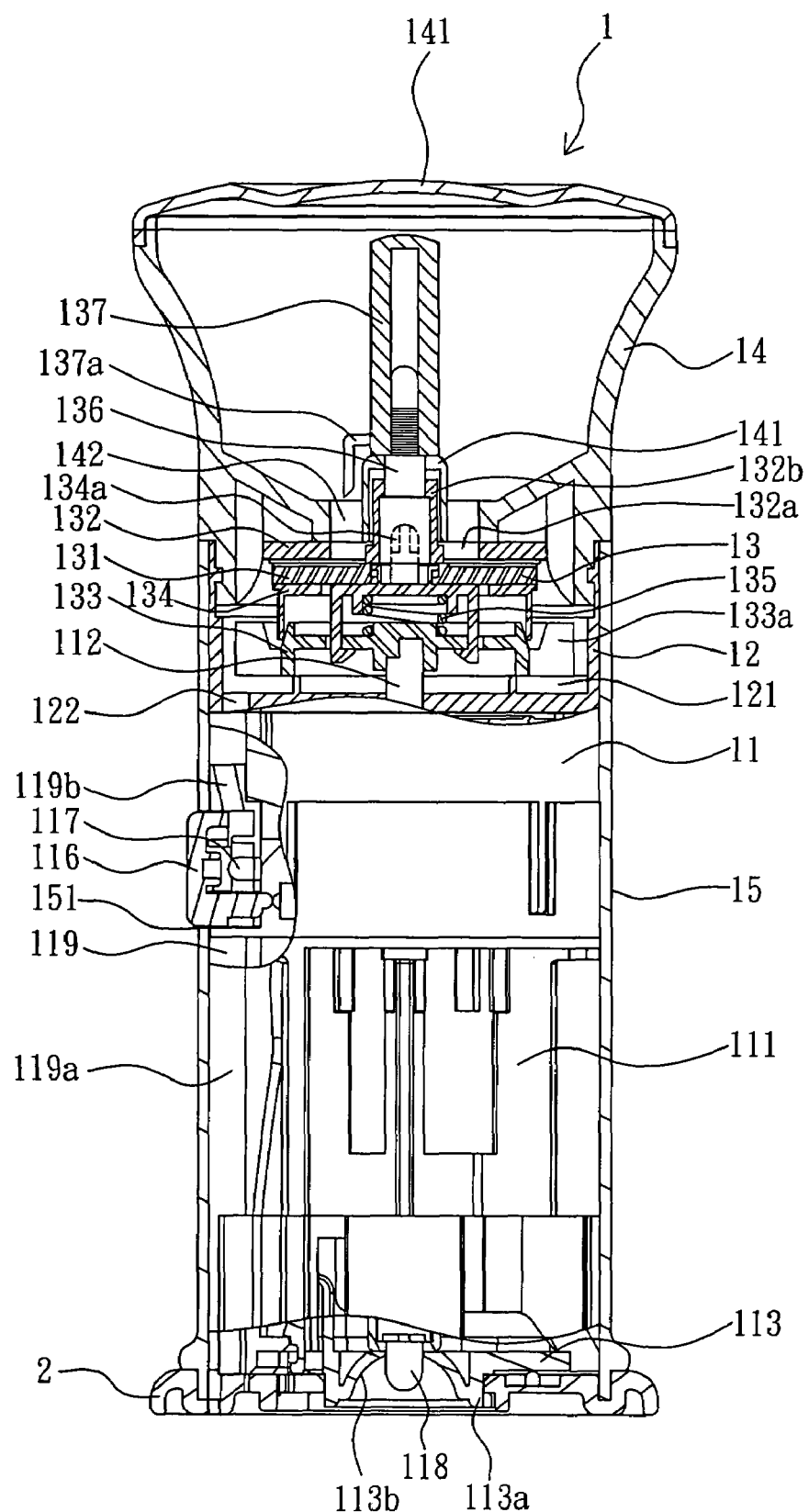
FIG. 2 is a sectional assembly view of the grinder in accordance with the present invention.
Figure 3:
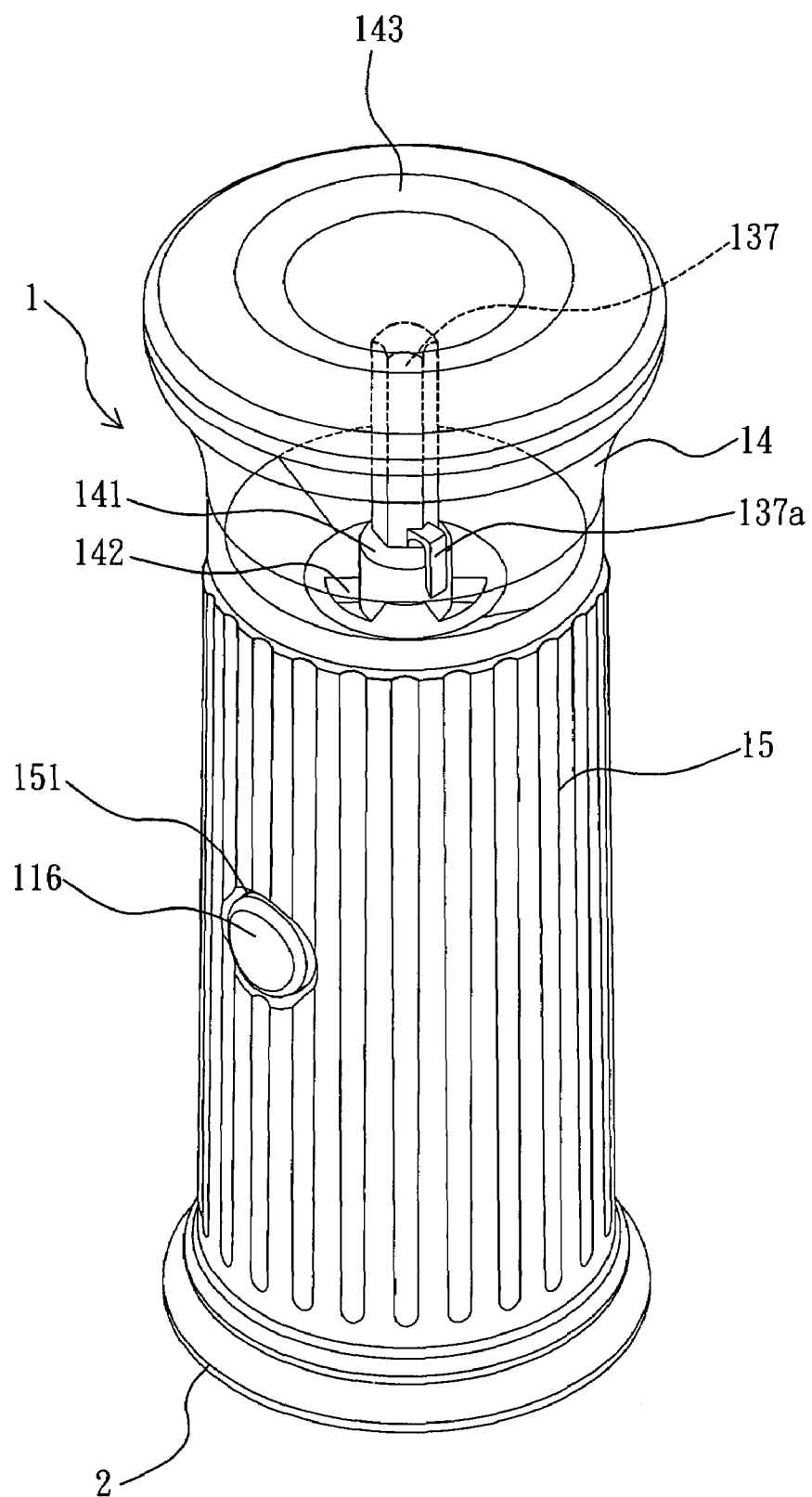
FIG. 3 is a perspective view of the grinder in accordance with the present invention.

Referring to FIGS. 1~3, the present invention is comprised of a grinder body 1 and a shut device 2.

The grinder body 1 is comprised of a driving unit 11, a hollow base 12, a grinding device 13, and a container 14.

The driving unit 11 comprises a battery chamber 111 in its bottom side, a motor (not shown) mounted therein and electrically connected to the battery cells (not shown) in the battery chamber 111, a speed reduction gear set (not shown) mounted therein and coupled to and rotatable by the motor, a spindle 112 coupled to the output end of the speed reduction gear set and axially extending out of the center of the top side of the driving unit 11, a battery lid 113, which covers the bottom side of the battery chamber 111 and has a plurality of positive electrodes and negative electrodes alternatively and equiangularly arranged on its top side around the border and one positive pole contact 114 and one negative pole contact 115 exposed out of its bottom side and respectively electrically connected to one positive electrode and one negative electrode (see FIG. 2), a control switch 116 protruded from the periphery near the top, and an indicator light, for example, LED (light emitting diode) 117 installed in the control switch 116 for power on/off indication. When the indicator LED 117 is turned on, it indicates that the power supply is in ON status. When switched on the control switch 116 at this time, the motor is started to rotate the speed reduction gear set and the spindle 112.

Further, the battery lid 113 has a bottom hub 113a. An illuminating light 118, for example, LED (light emitting diode) is installed in the bottom hub 113a of the battery lid 113. A smoothly arched reflector 113b is mounted inside the bottom hub 113a of the battery lid 113 around the illuminating light 118 for reflecting light from the illuminating light 118 toward the outside of the battery lid 113 for illumination so that the user can see the amount of ground powder dispensed out of the grinder when the user is holding or participating in a candlelight dinner or outdoor cooking at night.

The hollow base 12 is a top-open barrel fastened to the top side of the driving unit 11, having an inside grinding chamber 121, which has a bottom center through hole (not shown) for the passing of the spindle 112, a ground powder outlet 122 at one side for guiding out the ground powder. The driving unit 11 further has two ribs 119a protruded from the periphery and extending along the length, defining a discharge trough 119, which is disposed in communication with the ground powder outlet 122 of the hollow base 12 and has a bottom discharge opening 119c that has a width gradually reducing toward the bottom. The control switch 116 is provided in the discharge trough 119. A water-drop-like guide member 119b is mounted in the discharge trough 119 around the control switch 116 for guiding the discharging ground powder away from the control switch 116 when the discharging ground powder goes through the discharge trough 119.

The grinding device 13 is comprised of a grinding disk 131 and a grinding base 132. However, other grinding device designs for grinder may be used as a substitute. The grinding disk 131 is coupled to and rotatable by the spindle 112. The grinding base 132 is fixedly provided at the bottom side of the grinding disk 131, having a plurality of material inlets 132a through which the material to be ground, for example, sesame seeds go into the gap between the grinding disk 131 and the grinding base 132 and are then crushed by the grinding disk 131 during rotation of the grinding disk 131 to have the hard shells of sesame seeds be removed. The ground powder thus produced is then pushed by equiangularly spaced lugs 133a of a distribution disk 133 out of the ground powder outlet 122 so that ground powder falls out of the bottom discharge opening 119c of the discharge trough 119 to the outside of the grinder body 1 by means of gravity effect. The grinding disk 131 is fixedly fastened to a follower disk 134. The follower disk 134 is coupled to the distribution disk 133. A spring member 135 is stopped between the distribution disk 133 and the follower disk 134 so that the grinding disk 131 can be moved vertically downwards to compress the spring member 135. According to the present preferred embodiment, the grinding disk 131 and the grinding base 132 are respectively made of acid-proof, wearing proof, anti-oxidation precision ceramics so that the grinding device 13 does not cause the grounding material to change its quality.

To have a bridge-breaker function, a peg 134a is provided at the top of the follower disk 134 and inserted through the grinding disk 131, and a rotating rod 136 is connected to the top end of the peg 134a. The rotating rod 136 is inserted through a fixed bush 132b at the center of the grinding base 132 and a center hub 141 of the container 14, and then mounted with a stirring rod 137 for synchronous rotation with the grinding disk 131. The stirring rod 137 has a downwardly extending stirring strip 137a aimed at a filling hole 142 in the container 14 corresponding to the material inlets 132a of the grinding base 132 for breaking bridged part of the material to be ground.

The container 14 is mounted on the base 12 at the top. Preferably, the container 14 is transparent so that the user can visually check the amount of the material to be ground. The bottom side of the container 14 is fastened to the grinding base 132. Further, in order to close the container 14, a top cover 143 is covered on the top side of the container 14.

Further, in order to cause a sense of beauty, a housing 15 is provided to house the driving unit 11 and the base 12. The housing 15 has a switch hole 151 cut through the periphery for receiving the control switch 116.

Figures 4A, 4B:
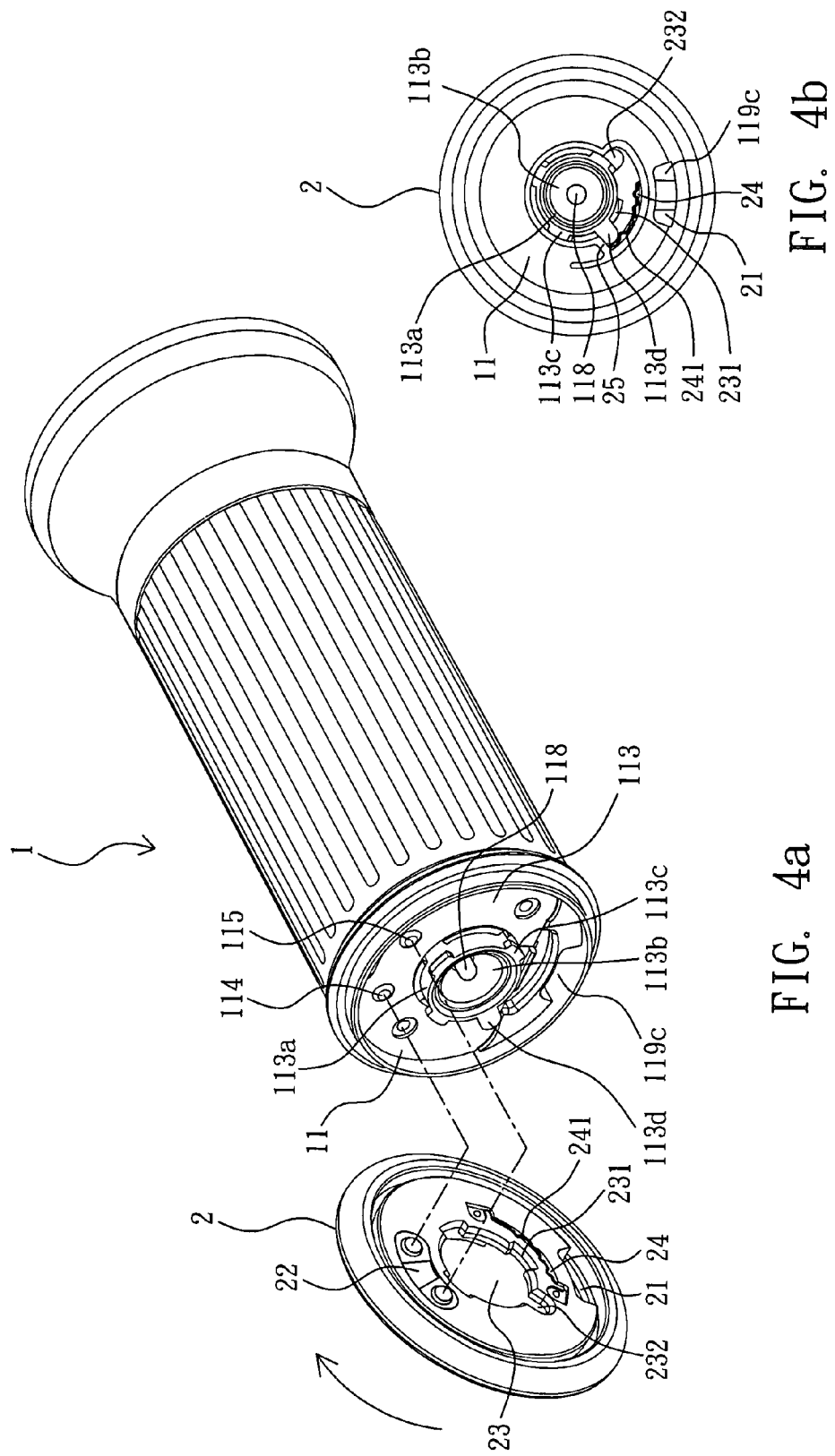
FIG. 4a is a schematic exploded view of the discharge opening and power control structure according to the present invention.
FIG. 4b is a bottom view of the discharge opening and power control structure according to the present invention.
Figures 5A, 5B:
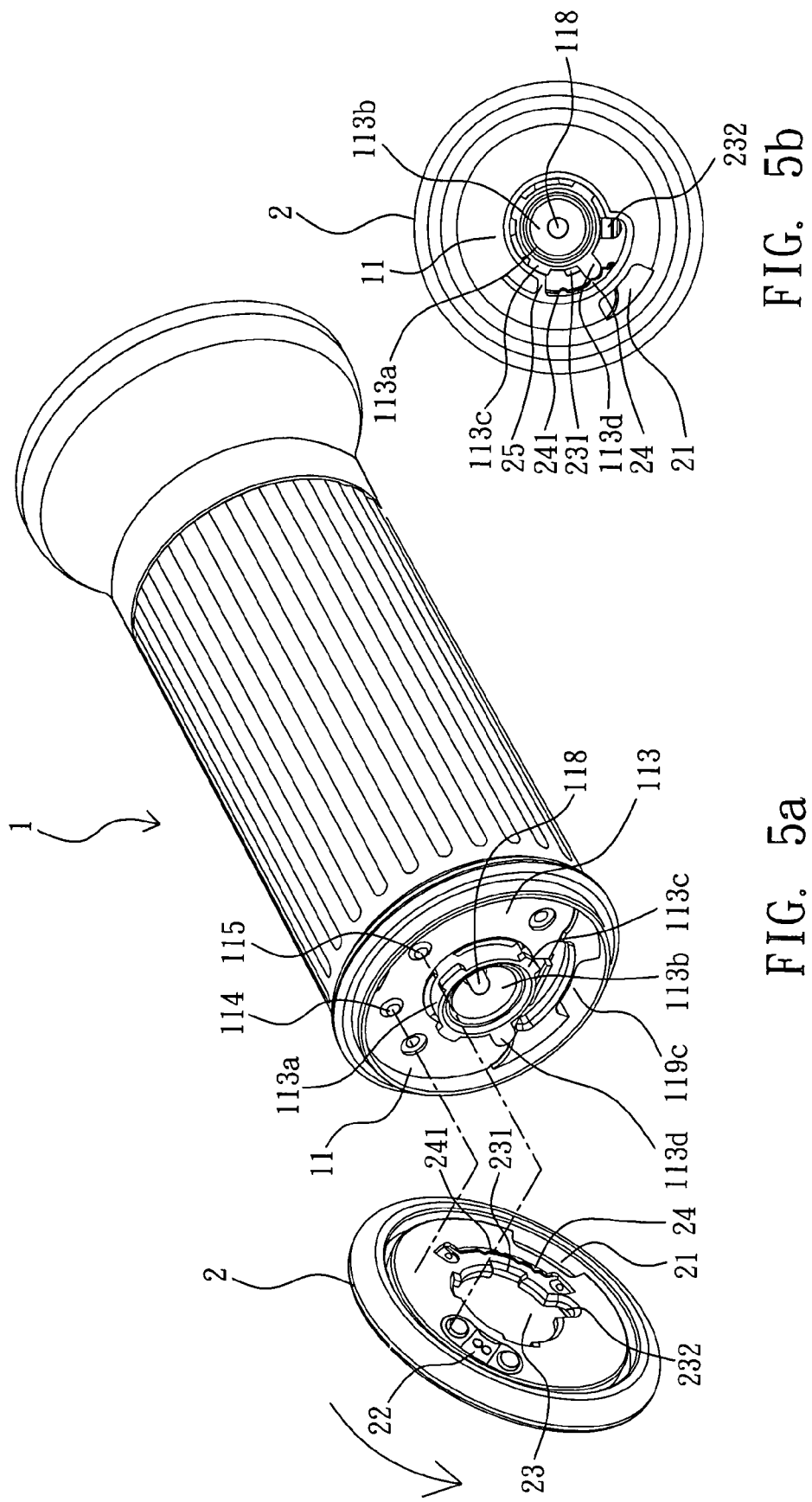
FIG. 5a is similar to FIG. 4a but showing the shut device rotated to off position.
FIG. 5b is similar to FIG. 4b but showing the shut device rotated to off position.

Referring to FIGS. 4a and 4b, the shut device 2 is coupled to the bottom hub 113a of the battery lid 113 of the driving unit 11, having a slot 21 corresponding to the discharge opening 119c. When the slot 21 is in alignment with the discharge opening 119c, the ground powder is discharged out of the discharge opening 119c and the slot 21. Referring to FIGS. 5a and 5b, the shut device 2 can be rotated relative to the driving unit 11 to close the discharge opening 119c. Further, the shut device 2 is provided with a metal connection plate 22. When the slot 21 is in alignment with the discharge opening 19c, the metal connection plate 22 contacts the positive pole contact 114 and the negative pole contact 115 to close the battery power circuit. At this time, the indicator light 117 in the control switch 116 is turned on to give off light, and the grinder is in standby status. When switching on the control switch 116 (pressing the control switch and holding it in the pressed condition), the indicator light 117 is turned off, the driving unit 11 is started to rotate the grinding disk 131 relative to the grinding base 132, and at the same time the illumination light 118 is turned on to give off light for illumination.

Further, the battery lid 113 has at last one locating protrusion 113c and a long stop rod 113d respectively protruded from the periphery of the bottom hub 113a. The shut device 2 has a center hole 23, at least one first notch 231 and a second notch 232 in communication with and spaced around the center hole 23, a sector sliding groove 24 in communication with the center hole 23 at one side, and a spring strip 241 fixedly mounted in the sector sliding groove 24. The spring strip 241 has multiple raised portions (not shown). After coupling of the shut device 2 to the bottom side of the driving unit 11, the shut device 2 can be rotated on the bottom hub 113a of the battery lid 113 to move the raised portions of the spring strip 241 over the stop rod 113d, and therefore the user can sense the step of the rotation of the shut device 2 relative to the driving unit 11. When the stop rod 113d is stopped at one end of the sector sliding groove 24, the slot 21 is in alignment with the discharge opening 119c, and the metal connection plate 22 is kept in contact with the positive pole contact 114 and the negative pole contact 115 to close the battery power circuit. When the stop rod 113d is stopped at the other end of the sector sliding groove 24, the stop rod 113d in alignment with the second notch 232 and the at last one locating protrusions 113c is in alignment with the at least one first notch 231, and the user can then remove the shut device 2 from the driving unit 11 for replacement of the battery cells.

As stated above, the grinder is provided with a shut device that prohibits external bodies from entering the driving unit. When the slot of the shut device is in alignment with the discharge opening of the discharge trough, the metal contact plate is kept in contact with the positive pole contact and the negative pole contact to close the power circuit and to turn on the indicator light, i.e., the grinder enters the standby mode. Further, the invention provides an illumination light and an indicator light for illumination during grinding and for operation status indication.

Although a particular embodiment of the invention has been described in detail for purposes of illustration, various modifications and enhancements may be made without departing from the spirit and scope of the invention.

What is claimed is:

1. A discharge opening and power control structure used in a grinder, comprising:

a grinder body, said grinder body comprising a discharge opening for discharge of the ground powder, and a battery chamber, said battery chamber having a positive pole contact and a negative pole contact extended out of said grinder body;

a shut device coupled to said grinder body and rotatable relative to said grinder body between a close position to close said discharge opening and to turn off power supply of said grinder body, and an open position to open said discharge opening and to turn on power supply of said grinder body, said shut device having a slot, which is in alignment with said discharge opening when said shut device is rotated relative to said grinder body to said open position, and a metal contact plate, which contacts said positive pole contact and said negative pole contact to turn on power supply of said battery chamber when said shut device is rotated relative to said grinder body to said open position.

2. The discharge opening and power control structure as claimed in claim 1, wherein said grinder body comprises a driving unit, a hollow base, a grinding device, and a container, said hollow base being mounted on a top side of said driving unit and having a grinding chamber and a discharge outlet for guiding ground powder out of said grinding chamber toward said discharge opening, said grinding device comprising a grinding disk and a grinding base respectively mounted in the grinding chamber inside said hollow base and at a bottom side of said container, said grinding disk being coupled to and rotatable by an upwardly extending spindle of said driving unit.

3. The discharge opening and power control structure as claimed in claim 1, wherein said battery chamber is provided at a bottom side of said driving unit and covered with a battery lid, said driving unit comprises a motor mounted above said battery chamber, and a speed reducing gear set coupled between said motor and a spindle.

4. The discharge opening and power control structure as claimed in claim 1, wherein said grinder body further comprises a control switch protruded from the periphery thereof, and an indicator light mounted in said control switch.

5. The discharge opening and power control structure as claimed in claim 1, wherein said grinder body comprises a bottom hub, an illumination light mounted in said bottom hub and electrically connected to said battery chamber, and a reflector mounted in said bottom hub around said illumination light.

6. The discharge opening and power control structure as claimed in claim 2, wherein said driving unit comprises two longitudinal ribs protruded from the periphery thereof, a discharge trough defined between said two longitudinal ribs in communication with a ground powder outlet of said hollow base, said discharge trough having a width gradually reducing downwards and terminating in said discharge opening.

7. The discharge opening and power control structure as claimed in claim 2, wherein said grinding device further comprises a distribution disk connected to said grinding disk inside said grinding chamber of hollow base, said distribution disk having a plurality of lugs equiangularly spaced around the periphery thereof.

8. The discharge opening and power control structure as claimed in claim 2, wherein said container has a top open side covered with a top cover.

9. The discharge opening and power control structure as claimed in claim 1, further comprising a housing surrounding said driving unit and said hollow base, said housing comprising a switch hole for receiving a control switch of said driving unit.

10. The discharge opening and power control structure as claimed in claim 1, wherein said grinder body comprises a bottom hub, at last one locating protrusion and a long stop rod respectively protruded from the periphery of said bottom hub; said shut device has a center hole coupled to said bottom hub, at least one first notch and a second notch disposed in communication with and spaced around the center hole of said shut device corresponding to said at least one locating protrusion and said stop rod, and a sector sliding groove disposed in communication with the center hole of said shut device at one side and coupled to the long stop rod of said grinder body; said shut device is rotatable on said bottom hub of said grinder body to move one of two opposite ends of said sector sliding groove into contact with said long stop rod of said grinder body, said slot of said shut device being in communication with said discharge opening when said long stop rod of said grinder body is stopped at one end of said sector sliding groove, said at least one first notch and a second notch of said shut device being respectively in alignment with the at last one locating protrusion and long stop rod of said grinder body for allowing removal of said shut device from said grinder body when said long stop rod of said grinder body is stopped at the other end of said sector sliding groove.

11. The discharge opening and power control structure as claimed in claim 10, wherein said shut device further comprises a spring strip fixedly mounted in said sector sliding groove, said spring strip having a plurality of raised portions that are moved over the long stop rod of said grinder body when said shut device is rotated relative to said grinder body.

* * * * *